No. 754,644. PATENTED MAR. 15, 1904.
S. J. DAVIS.
FRICTION CLUTCH MECHANISM.
APPLICATION FILED JULY 17, 1903.
NO MODEL.
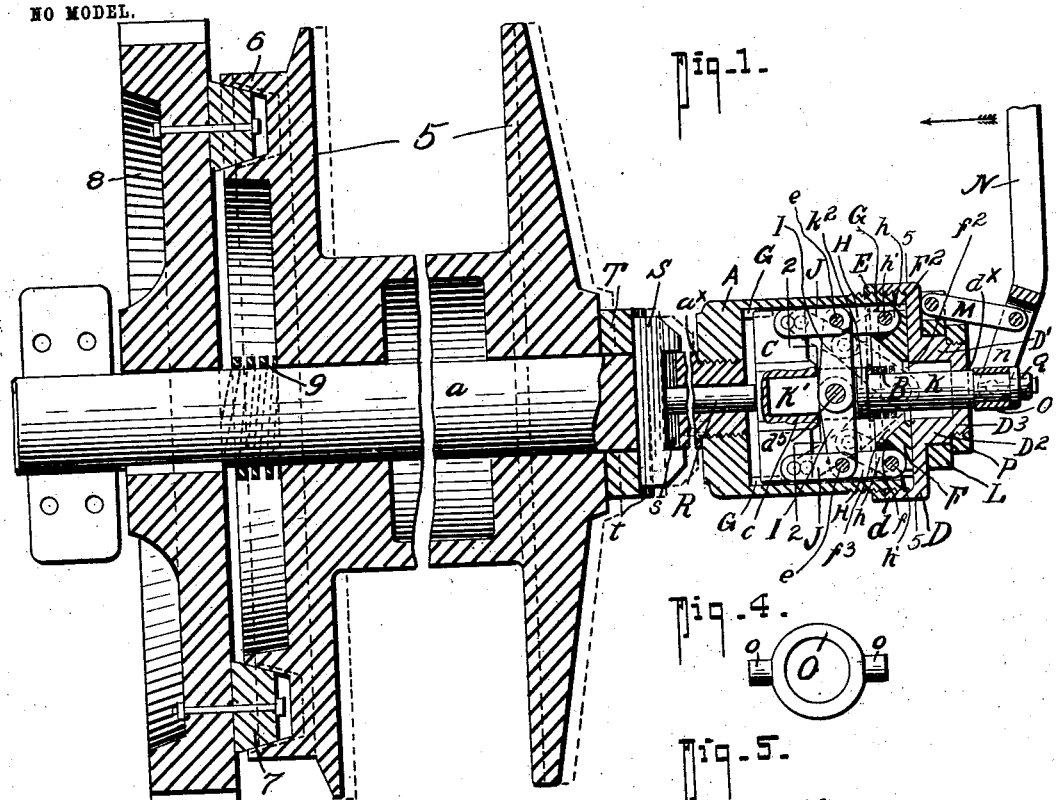
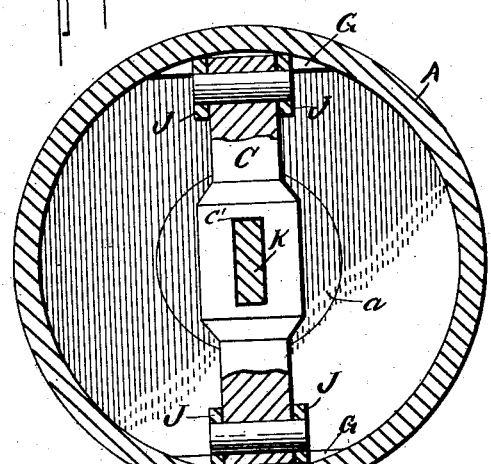
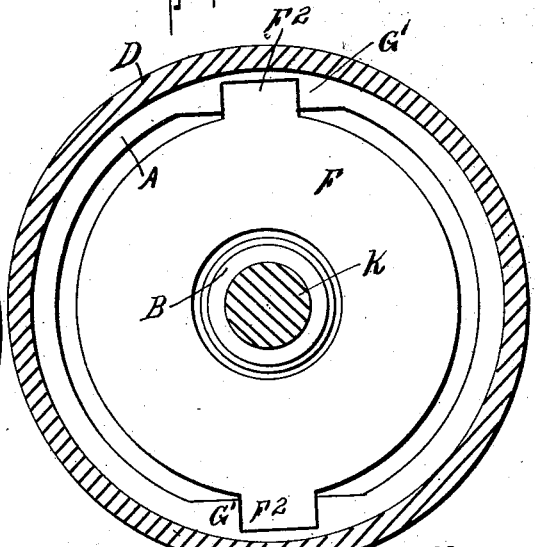
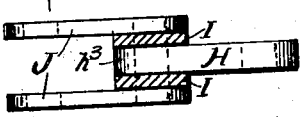
WITNESSES:
F. C. Gibson.
John T. Schrott.
INVENTOR
Spurgeon J. Davis,
BY
Fred G. Dieterich
ATTORNEYS.
THE NORRIS PETERS CO., PHOTO-LITHO., WASHINGTON, D. C.

No. 754,644. Patented March 15, 1904.

UNITED STATES PATENT OFFICE.

SPURGEON J. DAVIS, OF CATHLAMET, WASHINGTON, ASSIGNOR TO THE DAVIS-McGREGOR MANUFACTURING COMPANY, OF PORTLAND, OREGON, A CORPORATION.

FRICTION CLUTCH MECHANISM.

SPECIFICATION forming part of Letters Patent No. 754,644, dated March 15, 1904.

Application filed July 17, 1903. Serial No. 166,034. (No model.)

*To all whom it may concern:*

Be it known that I, SPURGEON J. DAVIS, residing at Cathlamet, in the county of Wahkiakum and State of Washington, have invented a new and Improved Friction Clutch Mechanism, of which the following is a specification.

This invention relates to improvements in that type of friction clutch mechanisms for hoisting, logging, or other engines in which is included a clutch member mounted on the power-shaft to rotate therewith, toggle clutch devices mounted on the shaft movable therewith, a shiftable clutch member adapted to be locked to its shifted position by the toggle clutch devices that coöperates with the clutch member rotatable with the drive-shaft; and my invention seeks to provide a clutch mechanism of this type of a simple and economical construction which can be easily manipulated to effect a quick clutch connection without danger of slipping and in which the friction devices are so designed and have such coöperative connection that after once set the load will be positively held.

My invention in its generic nature comprehends a cylindrical hub mounted on the drum-shaft to rotate therewith, a plunger or piston longitudinally movable in the drum-shaft which carries a clutch member for causing the drum-spool clutch to engage with the clutch-carrying gear upon the drive-shaft whereby to lock the said drum-spool and the drive-shaft to rotate together, toggle devices mounted upon the plunger or piston, means located externally of the shaft-rotated cylinder for shifting the toggle devices into a locked engagement with the cylinder whereby to lock the plunger-piston and to lock the clutch members of the drive-gear and the drum-spool to rotate with the cylinder and the shaft.

In its more subordinate features my invention consists in certain details of construction and peculiar combination of parts, all of which will be hereinafter fully described, and specifically pointed out in the appended claims, reference being had to the accompanying drawings, in which—

Figure 1 is a vertical longitudinal section of my improved clutch mechanism, the clutch-spool being shown out of an operative position in dotted lines. Fig. 2 is a cross-section of the same, taken substantially on the line 2 2 of Fig. 1. Fig. 3 is a detail view of the triple set of toggle-levers; and Fig. 4 is a detail view of the collar O, hereinafter described. Fig. 5 is a cross-section on line 5 5 of Fig. 1.

In the practical application of my invention the same includes a cylinder A, open at one end and provided with a centrally-threaded aperture $a^\times$ at the other or closed end whereby to admit of its being readily screwed up onto one end of the drum-shaft $a$. At diametrically opposite points the cylinder A has a pair of internal channels or grooves at each end formed by the flanges G, which form guideways for the endwise-adjustable cross-bar C and the ring or disk F, the purposes of which will presently appear.

D designates a cap whose annular flange $d$ is internally threaded to screw onto the cylinder A, and the said cap is rigidly held to its adjusted positions on the cylinder by a jam-ring E, as shown.

F indicates a ring or disk which is of a slightly less diameter than the cylinder A, whereby to freely slip into the open end thereof, and the said ring F has projections $F^2$, which slide in channels formed by the flange G' on the cylinder A, and the said ring F is held to bear against the cap D, and it has at diametrically opposite points recesses $f$ at its periphery, into which project the ends $h$ of toggle-links H H, pivotally mounted on the studs $h'$, and the said recesses $f$ are suitably shaped to accommodate the shiftable movements of the said toggle-links H. The disk F is also formed with a central aperture $f^2$, whose inner end merges with the oppositely-extended grooves or channels $f^3$, which are formed to accommodate the toggle-links I I when they assume the position shown in dotted lines on Fig. 1.

The cap D is formed with an outwardly-projected hollow hub D', having an annular flange $D^2$, adapted to receive a ring L, presently again referred to, and a threaded boss $D^3$, with which engages a threaded keeper or collar P, which holds the ring L on the flange $D^2$.

The hub $D'$ is centrally apertured, as at $d^\times$, and through the said aperture projects the outer end of a piston or plunger K, which extends into the cylinder and has its inner end $k'$, which is flattened or made rectangular in shape, projected into a rectangular socket $c'$ in the bar C.

Between the bar C and an annular enlargement or collar $k^2$ and upon a cross-stud $d^5$, secured to the plunger, are pivotally mounted the adjacent ends of a double set of toggle-links I I, that straddle the flattened end of the piston K and the inner ends $h^3$ of the links H, with which they pivotally connect through the stud-pins $e$ $e$, and the latter also join the links H and I with the links J J, that extend rearwardly and are pivotally connected with the shiftable bar C in a manner clearly shown in Fig. 1.

R designates the friction stem or pin, which butts against and is movable with the bar C and extends into the hollow drum-shaft $a$, and the other end of the said stem R engages with a cross-key S, which has edgewise movement in a cross-slot or keyway $s$ in the drum-shaft $a$, and the said key is adapted under its outer or clutching position to engage with the transversely-disposed socket $t$ in the adjacent wall of the collar T, which opposes the drum-spool 5, (see Fig. 1,) whereby when the spool is pushed, with its clutch-flange 6, into a tight frictional engagement with the drive-gear-clutch rim 7 of the drive-gear 8, the shaft, the spool, and the drive-gear are joined to rotate together.

When the plunger K is released, the spring 9 disengages the spool from the drive-gear, and to prevent too great a jar when the plunger K is released I provide a buffer-spring B, as shown.

The ring L is stationary, and to it is connected one end of a link M, the other end of which is pivotally connected with the forked end of a shifting-lever N, the ends $n$ of which engage the trunnions $o$ $o$ of a collar O, loosely mounted on the outer end of the piston K and held in place by the nut Q, as shown.

When the clutch mechanism is running, the parts L and O play loosely on the cap and the piston, respectively, and hence they effect little or no frictional resistance to the running of the machine.

From the foregoing, taken in connection with the accompanying drawings, the complete construction and manner of operation of my invention will be apparent to those skilled in the art to which my invention appertains. When the lever N is adjusted to the position shown in full lines in Fig. 1, the key S is locked with the collar T, and the latter is held in a tight frictional engagement with the drum-spool 5. To throw off the clutch mechanism, the lever N is swung forward in the direction of the arrow to bring the several toggle members to the position shown in dotted lines, which operation shifts the bar C to release the tension on the pin R and permits the spring 9 to force the drum-spool 5, with its clutch-flange 6, out of engagement with the gear clutch-ring 7. The spring B serves as a cushion to relieve the cap D of jar when the piston K is thrown back by lever action or by back pressure from the drum-spool 5.

By joining the cap D to the cylinder, as shown, the wear on the friction devices can be compensated for by turning the jam-ring E and the cap D a desired distance upon the cylinder A, and as the said cylinder at all times revolves with the drum-shaft it causes no friction whatever upon the ends of the stem R.

All parts rotate together. There is no friction on either end of pin R, as in ordinary friction-clutch mechanisms.

By closing both ends of the cylinders in the manner described and mounting the clutch-shifting devices within the said cylinder, as shown, the latter are effectively protected from the dirt and dust, and the coöperative arrangement of the several parts is such that they can be easily adjusted to take up wear as well as allowing for a considerable amount of wear before requiring a renewal of any of the parts.

By providing a detachable cap D for one end of the cylinder access can be quickly had to remove or adjust the working parts within the cylinder.

Changes in details of construction and modifications thereof can be readily made without departing from my invention or the scope of the appended claims.

Having thus described my invention, what I claim, and desire to secure by Letters Patent, is—

1. A mechanism of the class described, comprising in combination with a drum-shaft, a drive-gear carried thereby and a drum-spool loosely mounted upon said drum-shaft, said drive-gear and said drum-spool having coöperating clutch-faces, of means for shifting said drum-spool into tight frictional engagement with said drive-gear, said means including a cylinder mounted upon the end of the drum-shaft to rotate therewith, and clutch members having toggle connections with each other held within said cylinder, for the purposes specified.

2. In a device of the character stated, comprising in combination with a drum-shaft, the drive-gear and the drum-spool, of means for shifting said drum-spool into tight frictional engagement with the drive-gear, said means including a cylinder mounted upon the drum-shaft and open at one end, a detachable cap for said open end, a disk mounted in said end to bear against the inner side of the cap, a cross-bar at the other end of the cylinder, a stem slidable within an aperture in the drum-shaft and engaging said cross-bar, means for shifting said cross-bar, said means including a piston longitudinally movable through the cylinder, a toggle mechanism mounted on the piston and connected with the cross-bar and the disk, and means exterior to the cylinder for reciprocating said piston, for the purposes described.

3. In a device of the character stated, a drum-shaft, a drive-gear carried thereby, a drum-spool mounted thereon, said drum-shaft having a longitudinal aperture in one end and a cross-slot registering with the inner portion of said aperture, a cross-key movable within said cross-slot, a stem or pin longitudinally movable within said aperture and abutting said cross-key, a collar mounted upon said shaft between said drum-spool and said cross-key, a cylinder mounted upon said shaft to rotate therewith, and manually-operated means carried by said cylinder for shifting said stem or pin and said cross-key into engagement with said drum-spool to cause said drum-spool to engage said drive-gear to turn therewith, as specified.

4. The combination with a drum-shaft, a cylinder open at one end detachably connected thereto to rotate therewith; of a piston axially movable through the cylinder, a drive-gear mounted on the drum-shaft, for coöperating with the drum-spool, means for endwise interlocking said drive-gear and said drum-spool, said means including an endwise-movable ring and a cross-key secured to and movable in the cross-slot in the drum-shaft, and adapted to interlock with the endwise-movable ring, toggle clutch devices mounted within and coöperating with the cylinder and joined with the piston, and adjusted by shifting said piston, and means exterior of the cylinder for shifting said piston, as set forth.

5. In combination with a drum-shaft, a drum-spool loosely mounted and having endwise movement thereon; of a hollow cylinder secured to and rotatable with the drum-shaft; drum-spool-shifting mechanism located within the cylinder and adapted to be interlocked and rotate therewith, said shifting mechanism including a longitudinally-shiftable member, the movement of which controls the action of the said shifting mechanism and the endwise shifting of the drum-spool, and means for setting said shifting mechanism, for the purposes specified.

6. The combination in a drum-spool-shifting mechanism as described, with a drum-shaft, a drum-spool and a collar or ring loosely mounted thereon; of a cylinder open at one end secured to the shaft to rotate therewith, means for endwise moving the drum-spool, said means being detachably located within the cylinder and adapted under said adjustment of the parts to interlock and rotate with the cylinder for adjusting said internal mechanism, and a cap detachably and adjustably fitted over the open end of the cylinder, as set forth.

7. The combination with the drum-shaft and drum-spool, and the ring loosely mounted on said shaft for endwise movement thereon, and a drive-gear secured to rotate with said shaft; of a cylinder mounted on the drum-shaft to rotate therewith, a piston axially movable through the cylinder, a key coöperating therewith for interlocking with the endwise-movable ring on the drum-shaft, toggle devices mounted on the piston joined with the cylinder adapted under one adjustment to lock the drum-spool and the drive-gear to move together; means for reciprocating said piston, for the purposes specified.

8. In a clutch mechanism as described; the combination with the drum-shaft having a drive-gear secured thereon, and a drum-spool and a ring loosely mounted and having endwise movement thereon; of a cylinder secured to the drum-shaft to rotate therewith and having diametrically opposite longitudinal guides at each end, a cross-bar for engaging the guides at one end, of a disk having portions for engaging the guides at the other end, a piston axially movable in the cylinder and connecting to said cross-bar, a stem axially projected from the cross-bar through the drum-shaft, a key carried by the drum-shaft for interlocking with the endwise-movable ring, a detachable cap for one end of the cylinder, said disk having portions for engaging the longitudinal guides at the open end of the cylinder being adapted to engage the interior wall of said cap, toggles I I secured to the piston, toggles H connecting the toggles I I with the cap-engaging disk, and toggles J for connecting the toggles H and I with the cross-bar, a buffer-spring, and means exterior of the cylinder for reciprocating the piston, all being arranged substantially as shown and described.

SPURGEON J. DAVIS.

Witnesses:
A. T. LEWIS,
OGLESBY YOUNG.